United States Patent [19]
Maxwell et al.

[11] Patent Number: 4,647,086
[45] Date of Patent: Mar. 3, 1987

[54] TUBE COUPLING

[75] Inventors: Reginald R. Maxwell, Huntington Woods; Walter J. Budzinski; Manfred K. Kuttruff, both of Sterling Heights; Leo S. Stanish, Grosse Pointe Woods; Larry G. Turner, Clarkston, all of Mich.

[73] Assignee: Brass-Craft Manufacturing Company, Southfield, Mich.

[21] Appl. No.: 788,341

[22] Filed: Oct. 17, 1985

Related U.S. Application Data

[63] Continuation-in-part of Ser. No. 565,894, Dec. 27, 1983, abandoned, which is a continuation-in-part of Ser. No. 513,722, Jul. 14, 1983, abandoned.

[51] Int. Cl.⁴ .............................................. F16L 19/06
[52] U.S. Cl. .................................... 285/342; 285/343; 285/382.7
[58] Field of Search .................... 285/382.7, 341, 342, 285/343, 249

[56] References Cited

U.S. PATENT DOCUMENTS

| | | | |
|---|---|---|---|
| 2,152,537 | 3/1939 | Couty | 285/382.7 X |
| 2,503,169 | 4/1950 | Phillips | 185/382.7 X |
| 2,585,453 | 2/1952 | Gallagher et al. | 285/382.7 X |
| 3,219,367 | 11/1965 | Franck | 285/382.7 X |
| 3,275,350 | 9/1966 | Kody et al. | 285/382.7 X |
| 3,493,250 | 2/1970 | Hertel | 285/382.7 X |

FOREIGN PATENT DOCUMENTS

| | | | |
|---|---|---|---|
| 1016213 | 8/1977 | Canada | 285/382.7 |
| 2437560 | 5/1980 | France | 285/382.7 |
| 617048 | 1/1949 | United Kingdom | 285/342 |

*Primary Examiner*—Richard J. Scanlan, Jr.
*Attorney, Agent, or Firm*—Steven L. Permut; Malcolm L. Sutherland; Leon E. Redman

[57] ABSTRACT

A compression type coupling 10 for pipes has a body member 12 and a fastener member 14 and a ferrule 16 wherein the fastener member has a perpendicular shoulder 36 with respect to a longitudinal axis of the pipe 18 and abuts a squared shoulder section 42 of the ferrule to prevent the ferrule from being squeezed out of the compression coupling 10. The ferrule has outwardly radially extending flanges to retain it within the fastener member. The ferrule also has radially inwardly extending teeth that bite into the pipe to prevent the pipe from backing out. The ferrule also has an axially inner section 40 with notches 62 formed therein. The end 40 is deformed by a camming surface 28 on the body 12 to crimp the pipe 18 as the fastener member 14 is secured to the body member 12. The axially inner section 40 forms a right angled shoulder that abuts the pipe and prevents the pipe from being easily pulled out of the coupling.

15 Claims, 11 Drawing Figures

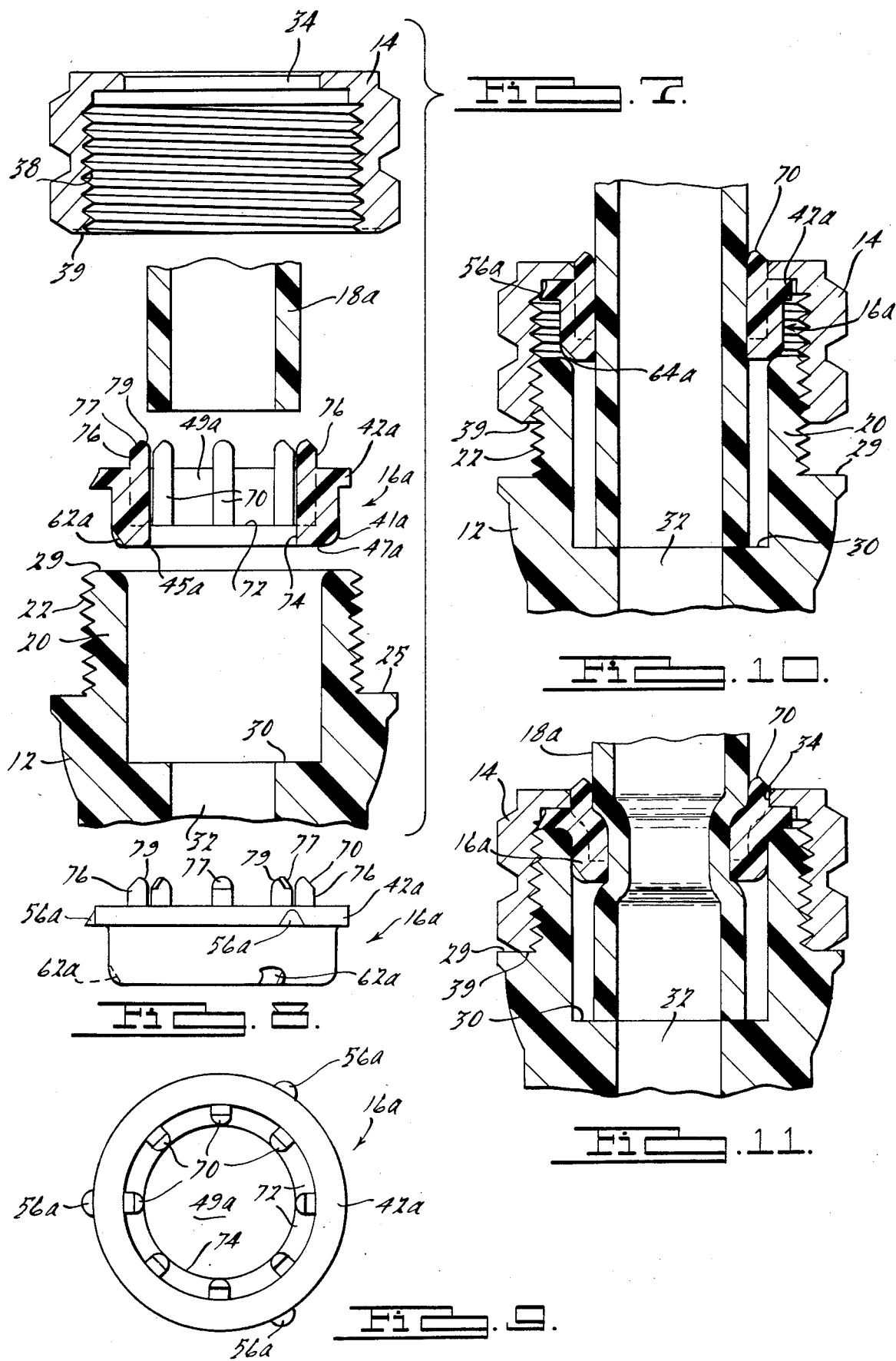

TUBE COUPLING

BACKGROUND OF THE INVENTION

This is a continuation-in-part of application Ser. No. 656,894 filed Dec. 27, 1983 now abandoned which is a continuation-in-part of application Ser. No. 513,722, filed July 14, 1983 (now abandoned).

TECHNICAL FIELD

This invention relates to a coupling assembly and more particularly to a pipe coupling assembly for fastening a tube thereto.

DISCLOSURE INFORMATION

Many types of coupling assemblies have been devised for attaching pipes thereto. Often, a coupling assembly has a housing nut, a sealing ring, and a separate locking ring. The housing conventionally has an externally threaded socket portion which engages the nut having an internally threaded socket portion therein. The pipe passes through an opening in the nut. The sealing ring is usually positioned within the interior of the nut and seals the coupling body and nut. The lock ring retains the pipe in place.

Other coupling assemblies do not have a separate lock ring. The sealing ring receives a pipe made from flexible tubing and both seals and locks the tubing in place. The problem with many of these coupling assemblies is that the sealing ring, often made from a resilient elastomeric or thermoplastic material, will be deformed under pressure and often squeeze through any clearance in the opening between the tubing and nut. These compression coupling assemblies leak if the sealing ring is squeezed out of the coupling. Furthermore, these compression fittings often allow the tubing to be pulled out of the fittings with little resistance.

Ease of installation is a problem with many sealing rings. Often the sealing rings do not adequately retain the tubing in position as the nut is tightened. As the nut is tightened, vibration can cause the tubing to pull away and unseat from the coupler body. Basically a plumber often needs a third hand to hold the tubing in place to prevent the pipe from being displaced.

Another problem occurs when there is testing of the coupling assembly. Often air testing is done to assure against leakage. Air pressure is introduced into the tubing and the coupling assembly is inspected for leakage. If the coupling assembly is properly tightened, no leakage should occur. On the other hand, it is desirable to assure that leakage does occur if the coupling assembly is not tightened onto the tubing.

What is needed is an inexpensive coupling assembly that is easily installed, easily tested, and assures that the tubing when secured therein has a reduced possibility of leakage.

SUMMARY OF THE INVENTION

In accordance with one embodiment of the invention, a tube coupling assembly has a body member having a socket portion at an axial end thereof, a ferrule which slidably fits about a pipe preferably made from flexible plastic material such as PB (polybutylene) and a fastener member, for example, a nut. The fastener member threadably engages the body and tightens down onto the ferrule to deform the ferrule such that it bites into the outer wall of the pipe and deforms it to sealingly lock the pipe in the socket portion of the body.

The axial outer end of the socket preferably has a flared opening with a radial camming surface. The fastener member has a shoulder surrounding a central hole. The shoulder is substantially transverse to the longitudinal axis of the pipe passing through the hole. More broadly, the shoulder can be either substantially transverse or form an acute angle with the outer surface of the pipe with the angle facing the outer axial end of the fastener.

The ferrule, a sealing ring made from a deformable plastic material, is interposed between the flared opening of the socket and shoulder of the fastener. The ferrule has an axial outer shoulder section and a deformable axial inner section. The deformable inner section has a radially curved lower end that seats on the flared opening of the socket. When the fastener is tightened, the camming surface of the socket forces the deformable inner section radially inward to bite into the pipe. The outer shoulder section becomes wedged between the flared opening of the socket and the shoulder of the fastener. The top end of the shoulder section has an annular surface that flushly abuts the shoulder of the fastener. At least one, and preferably a plurality of flanges extend radially outward from the shoulder section to engage internal threads in the fastener member that retain the ferrule in the fastener before the fastener engages the body member.

A radially interior cylindrical wall of the ferrule has at least one, and preferably a plurality of circumferentially spaced inwardly protruding teeth which retain the pipe and prevents the pipe from easily sliding in an outward or disengaging direction. The teeth preferably have a lower surface transverse to the cylindrical wall with an inner edge forming a chord with respect to the inner cylindrical wall. The top surface of each tooth is inclined at an angle of about 15° from the vertical to the inner edge to allow the pipe to enter the ferrule from the top.

The lower end of the deformable section has a radial section blending into an annular shaped end forming a right angle with the interior cylindrical wall of the ferrule. At least one and preferably two radially opposed notches are formed in the radial section such that when the radial section is seated on the flared opening before the fastener is tightened, the notches provide for leakage from the socket section.

When the fastener is fastened onto the socket portion, the inner end is deformed into the flared opening of the socket to engage and deform the outer wall of the pipe. The notches no longer provide leakage and a leak proof seal is provided. Preferably, once the ferrule is deformed, the deformation is permanent and the ferrule is permanently crimped onto the flexible pipe. In addition, the deformation on the outer wall of the pipe is also permanent. The ferrule is prevented from being squeezed out through any clearance between the fastener and pipe because of the angle of the shoulder. The pipe is prevented from being withdrawn out of the coupler because of the right angle at which the lower end crimps into the pipe.

BRIEF DESCRIPTION OF THE DRAWINGS

Reference now will be made to the accompanying drawings in which

FIG. 7 is an exploded and cross-sectional side elevational view of a second embodiment according to the invention;

FIG. 8 is a side elevational view of the ferrule shown in FIG. 7;

FIG. 9 is a top plan view of the ferrule shown in FIG. 7;

FIG. 10 is a cross-sectional view of the coupling assembly shown in an assembled but untightened condition; and FIG. 11 is a view similar to FIG. 10 showing the coupling assembly in a tightened condition.

DETAILED DESCRIPTION OF THE PREFERRED EMBODIMENTS

Figure 1:
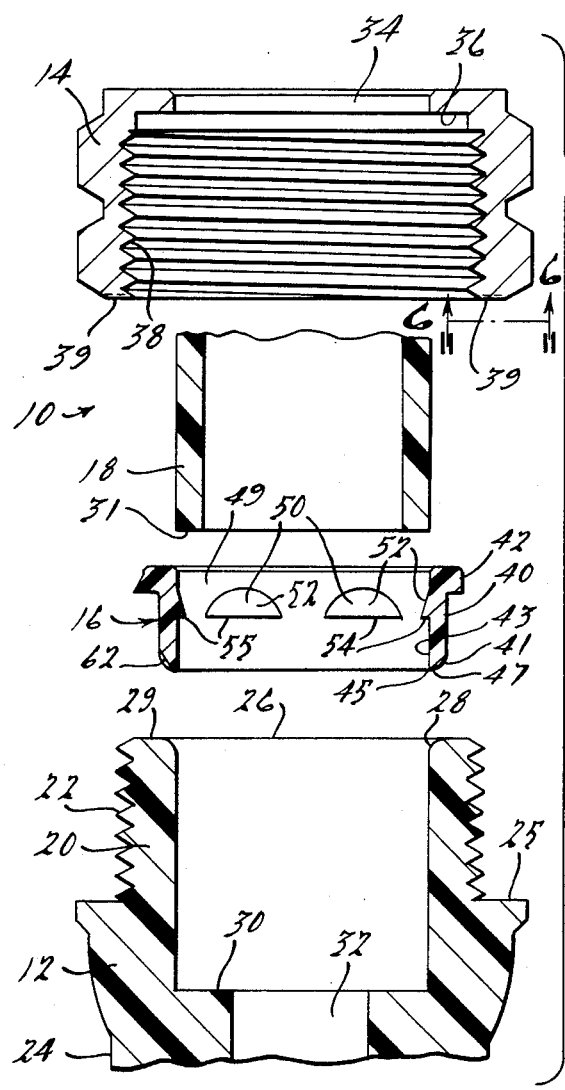
FIG. 1 is an exploded and cross-sectional side elevational view of a coupling assembly in accordance with the invention.

Referring to FIGS. 1 through 6, a tube coupling 10 has a body member 12, a fastener member 14 and a ferrule 16 fastened together to secure a deformable plastic pipe 18 to the body member 12. The pipe 18 is preferably made from polybutylene.

The body member 12, preferably made from plastic material such as acetal, for example, Delrin TM, has a socket portion 20 that has external threads 22 on its external surface 24. An annular shoulder 25 surrounds the lower end of socket portion 20. The open end 26 of the socket portion 20 is flared with a radial camming surface 28 and a flat annular shoulder 29 thereabout. The inner end of the socket portion 20 has a shoulder 30 which is adapted to abut the end 31 of the pipe 18. A longitudinal bore 32 extends through the body inwardly from shoulder 30.

Fastener member 14, preferably made from brass, has a central opening 34 and an annular shoulder 36 extending at right angles from the opening 34 such that the shoulder is substantially transverse from the longitudinal axis of the pipe 18 extending through the fastener. Fastener member 14 has an internal threaded section 38 which engages the external threads 22. Furthermore, the fastener member 14 has a knurled bottom 39 as more clearly shown in FIG. 6.

The ferrule 16 is made from Celcon TM, a deformable plastic material and has an inner deformable section 40 that engages the camming surface 28 of flared opening 26. The deformable section 40 has a radial curved outer surface section 41 that meets an annular flat ledge 47 at its lower end. The flat ledge 47 in turn meets inner cylindrical wall 43 at a right angle along edge 45. The ferrule 16 has a squared shoulder section 42 which flushly abuts shoulder 36.

In addition, the ferrule has internal teeth 50 that, with a tapered and inclined upper surface 52 and transverse lower surface 54, meet at an edge 55 that defines a chord of central opening 49. The teeth 50 allow the pipe to be inserted through the central aperture 49 defined by cylindrical wall 43 but prevent it from backing off.

Figure 4:
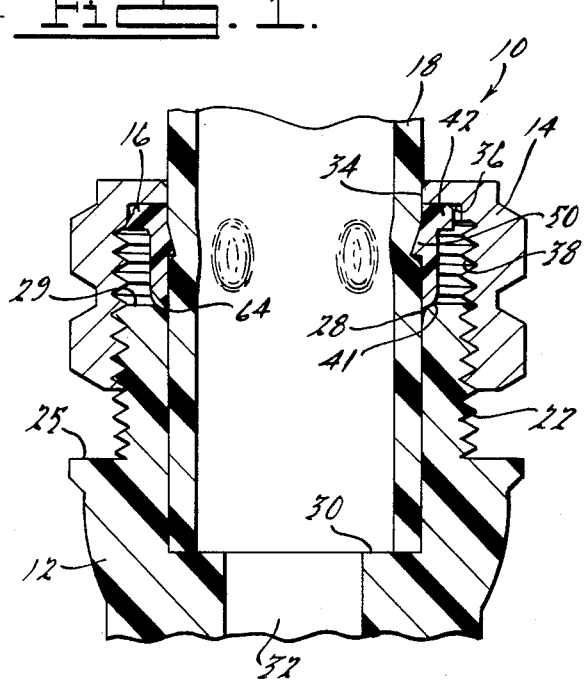
FIG. 4 is a cross-sectional view of the coupling assembly shown in FIG. 1 in an assembled but untightened condition.
Figure 2:
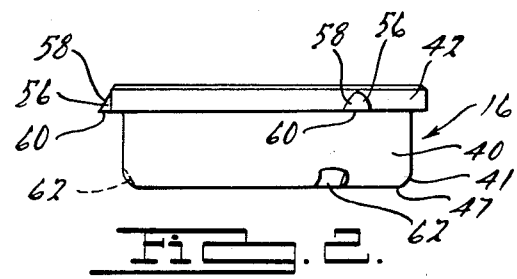
FIG. 2 is a side elevational view of the ferrule shown in FIG. 1.
Figure 3:
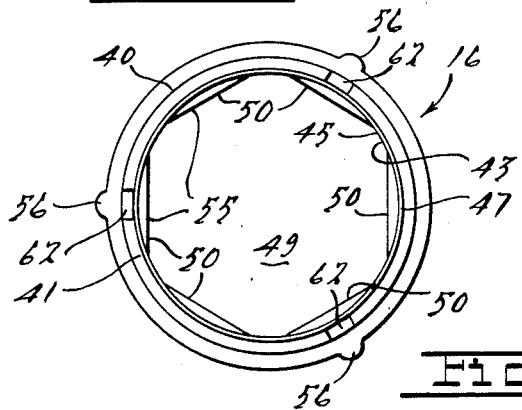
FIG. 3 is a bottom plan view of the ferrule.

Secondly, the shoulder section 42 has radially extending external retaining flanges 56 that have tapered and inclined upper surfaces 58 and transverse lower surfaces 60 to allow the ferrule 16 to be snap fitted or threaded into the fastener member 14 and be retained therein before insertion of the pipe 18 or assembly onto body 12. Thirdly, the ferrule 16 has notches 62 cut into the radial outer surface 41. The notches 62 provide for gaps 64 (one shown in FIG. 4) between the radial camming surface 28 and radial outer surface 41 when the ferrule 16 sits on the surface 28 of body 12 as shown in FIG. 4. As also shown in FIG. 4, the ferrule 16 is sized to snugly fit about the pipe 18 with the teeth 50 slightly biting into and deforming pipe 18.

Assembly of the coupling assembly 10 is relatively straightforward. The ferrule 16 is first snap fitted into the fastening member 14 and the fastener member 14 is then threaded onto the body 12 by hand until the ferrule 16 has its radial surface 41 abut the radial camming surface 28 of body 12 as shown in FIG. 4. At this point, the pipe 18 is inserted and pushed through opening 34 of fastening member 14 and aperture 49 and deformed by teeth 50 until pipe 18 abuts shoulder 30 to the position shown in FIG. 4.

A wrench or other similar tool is then used to tighten fastener member 14 onto body 12 to deform ferrule 16. The gaps 64 are closed up only after fastener member 14 is tightened at least one full turn beyond the position shown in FIG. 4.

The teeth 50 prevent the pipe 18 from vibrating or otherwise moving up out of socket 20 as the fastener member 14 is being tightened so that the pipe does not need to be secured or held in place by another tool or a hand.

Figure 5:
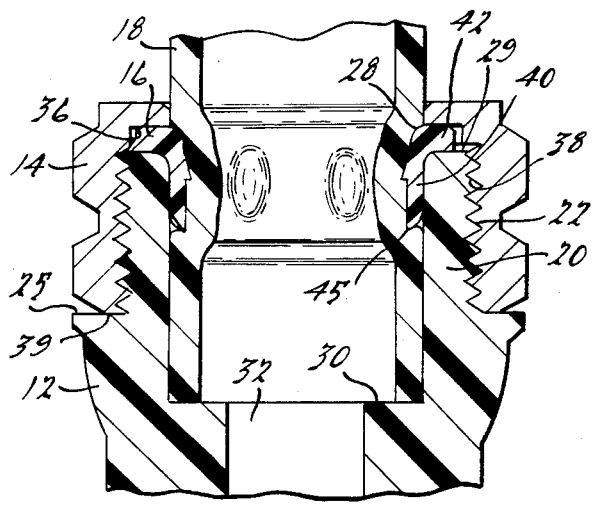
FIG. 5 is a view similar to FIG. 4 showing the coupling assembly in a tightened condition.
Figure 6:
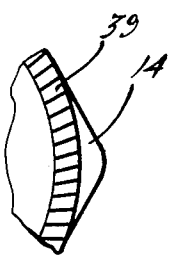
FIG. 6 is a fragmentary bottom plan view of the fastener member.

The fastener is then tightened until the shoulder section 42 becomes wedged between shoulder 29 on body 12 and shoulder 36 on fastener member 14. Knurled end 39 digs into shoulder 25 of body 12 as shown in FIG. 5. The knurled end 39 acts as a lock to prevent the fastener member 14 from loosening.

When the fastener member 14 is tightened over the body member 12, the section 40 of ferrule 16 is forced by the camming surface 28 to deform inwardly into the socket portion 20 and to permanently crimp the flexible pipe 18. Furthermore, a building of polybutylene material occurs about radial surface 41 as the edge 45 digs into the pipe 18 to provide a fluid tight seal.

The shoulder 36 of fastener member 14 forms a right or acute angle facing the axial outer end of the coupling 10 and flushly abut section 42 to prevent the ferrule from being squeezed out through any clearance between the fastener member 14 and pipe 18. The tapered section 40 crimps down on the outer surface 44 of pipe 18 and prevents pipe 18 from being easily withdrawn without the fastener member being removed from the body member. The right angled edge 45 formed between wall 43 and annular flat end 47 prevents the pipe 18 sliding by edge 45.

Referring to FIGS. 7-11, a second embodiment of a coupling assembly 10a is shown. The assembly 10a uses the same fastening member 14 and body member 12 as the first embodiment. The ferrule 16a is modified in order to accommodate a smaller diameter pipe 18a.

The ferrule 10a has a top shoulder section 42a and inner deformable section 40a. The shoulder section 42a has retaining flanges 56a to retain the ferrule 16a in the fastening member 14. The inner deformable section 40a includes radial outer surface section 41a and annular flat ledge 47a at its lower end. The radial outer surface section 41a has a plurality of circumferentially spaced notches 62a that serve the same purpose as notches 62 in the first embodiment. The flat ledge 47a meets inner edge 74 of shoulder 72 at right angle edgd 45a. The cylindrical inner wall 43a has a plurality of circumferentially spaced locating ribs 70 that extend from a lower annular shoulder 72 to a point above and beyond the top end of shoulder section 42a. The radial inner point of the ribs 70 and the inner diameter 74 of shoulder 72 are positioned and sized to be the same as the outer diameter of pipe 18a. The outer upper surface 76 of ribs 70 are positioned to snugly fit in aperture 34 of fastener 14. Tapered surfaces 77 and 79 are used as guides for positioning the pipe 18a and fastener 14, respectively.

Assembly of the coupling assembly 10a is similar to the first embodiment. The ferrule 16a is snap fitted into the fastening member 14 and the fastener 14 is threaded onto body 12 until the ferrule 16a has its radial surface 41a abut the radial camming surface 28 of body 12 has shown in FIG. 10 forming a plurality of gaps 64a. Then the pipe 18a is inserted and pushed through opening 34 and opening 49a in ferrule 16a until it abuts shoulder 30 in body 12 as shown in FIG. 10.

A wrench or other similar tool is then used to tighten fastener member 14 onto body 12 and to deform ferrule 16a and close gaps 64a after a full turn of the fastener member 14. The ferrule 16a becomes deformed as shown in FIG. 11 to crimp pipe 18a and fix and seal it onto body member 12 in the same fashion as the first embodiment.

Ferrule 16a provides for pipe 18a differing in size from pipe 18 to be coupled to the same sized body 12 with use of the same size fastener 14. Hence inventory is simplified and the coupling assembly can be manufactured for a broad based market where several sized pipes may be used.

In this fashion, an inexpensive but effective compression type fitting is made which minimizes leakage, prevents a sealing ring from being squeezed out of fastener member, and provides a positive lock for the pipe. Furthermore, easy installation and easy and accurate testing is provided by the coupling assembly according to the invention.

Variations and modifications of the present invention are possible without departing from its scope and spirit as defined by the appended claims.

The embodiments of the invention in which an exclusive property or privilege is claimed are defined as follows:

1. A tube coupling characterized by:
   a body having a longitudinal bore therethrough and an axial end section defining a socket therein sized to receive a flexible pipe;
   said axial section having an external wall thereabout, an outwardly flared opening at its axial outer end, and a pipe locating means at its inner end;
   a fastener member engaging the external wall of said body, said fastener having a central opening sized to receive said pipe and an annular shoulder about said opening with said shoulder being substantially perpendicular to the longitudinal axis of said pipe extending through said central opening;
   a sealing ring made from a deformable flexible material sized to fit within said fastener member;
   said ring having an axially outer end constructed to abut flushly against said shoulder;
   said sealing ring having a central opening sized to receive said flexible pipe;
   said sealing ring having a plurality of circumferentially spaced teeth circumscribing said central opening such that as said pipe is inserted through said opening said teeth deform said pipe and prevent said pipe from being pulled out of said ring; and
   said sealing ring having an axially inner deformable section constructed to engage said flared opening such that as said fastener member is fastened onto said body, said sealing ring has its axially inner section forced inwardly by said flared opening of said socket and pressed into an external surface of said flexible pipe, with said ring being prevented from backing up by said perpendicular shoulder of said fastener member.

2. A tube coupling as defined in claim 1 further characterized by:
   said teeth of said sealing ring having a tapered and inclined upper surface and transverse lower surface meeting at an inner edge defining a chord of said central opening.

3. A tube coupling as defined in claim 1 wherein said pipe locating means includes a shoulder at the axially inner end of said socket adjacent said longitudinal bore.

4. A tube coupling as defined in claim 2 wherein said end of said body is externally threaded and said fastener is internally threaded to threadably engage said body.

5. A tube coupling characterized by:
   a body having an axial end section defining a socket therein sized to receive a pipe, a fastener engaging surface, a passage extending axially inward from said socket, and a camming surface in said socket tapered axially and radially inward;
   a fastener member engaging said fastener engaging surface, having an opening through its axially outer end and a shoulder about said opening forming an acute or right angle facing said axially outer end;
   a sealing ring made from deformable material sized to fit within said fastener member and having an annular axially outer end constructed to abut said shoulder;
   said annular axially outer end having a plurality of integrally formed circumferentially spaced radially extending flanges for snap fitting within said fastener and retaining said ring in said fastener;
   said sealing ring having an axially inner section constructed to engage said camming surface;
   said sealing ring having an opening therethrough sized to receive said pipe such that as said fastener member is fastened to said engaging surface, said sealing ring has its axially inner section forced radially inwardly by said camming surface and pressed against an external surface of said pipe.

6. A tube coupling as defined in claim 5 further characterized by:
   said sealing ring having a plurality of circumferentially spaced teeth circumscribing said central opening such that as said pipe is inserted through said central opening said teeth deform said pipe and prevent said pipe from being pulled out of said ring.

7. A tube coupling as defined in claim 6 further characterized by:
   said teeth of said sealing ring having a tapered and inclined upper surface and transverse lower surface meeting at an inner edge defining a chord of said central opening.

8. A tube coupling characterized by:
a body having a longitudinal bore therethrough and an axial end section defining a socket therein sized to receive a flexible pipe;
said axial end section having an external wall thereabout, an outwardly flared opening at its axial outer end, and a pipe locating means at its inner end;
a fastener member engaging the external wall of said body, said fastener having a central opening sized to receive said pipe and an annular shoulder about said opening;
a sealing ring made from a deformable flexible material sized to fit within said fastener member;
said ring having an axially outer end constructed to abut flushly against said shoulder;
said sealing ring having an axially inner section constructed to engage said flared opening; and
said sealing ring having a central opening sized to receive said flexible pipe such that as said fastener member is fastened onto said body, said sealing ring has its axially inner section forced inwardly by said flared opening of said socket and pressed into an external surface of said flexible pipe, with the axially inner end of said sealing ring forming a right angled shoulder with respect to the longitudinal axis of said pipe;
said axial inner end of said sealing ring has a curve shaped exterior surface section that sits on the outwardly flared opening of said socket of said body;
said curve shaped exterior surface section having at least one notch therein to form a gap between said sealing ring and said body when said sealing ring is seated on said flared opening.

9. A tube coupling as defined in claim 8 further characterized by:
said axially outer end of said sealing ring having a plurality of circumferentially spaced and radially outwardly extending flanges for snap fitting into said fastener and retaining said sealing ring in said fastener.

10. A tube coupling as defined in claim 8 further characterized by:
said sealing ring having a plurality of circumferentially spaced teeth circumscribing said central opening such that as said pipe is inserted through said central opening said teeth deform said pipe and prevent said pipe from being pulled out of said ring.

11. A tube coupling as defined in claim 9 further characterized by:
said teeth of said sealing ring having a tapered and inclined upper surface and transverse lower surface meeting at an inner edge defining a chord of said central opening.

12. A tube coupling characterized by:
a body having a longitudinal bore therethrough and an axial end section defining a socket therein sized to receive a flexible pipe;
said axial section having an external wall thereabout, an outwardly flared opening at its axial outer end, and a pipe locating means at its inner end;
a fastener member engaging the external wall of said body, said fastener having a central opening sized at least the size of said pipe in cross-section and an annular shoulder about said opening;
a sealing ring made from a deformable flexible material sized to fit within said fastener member;
said ring having an axially outer end constructed to abut flushly against said shoulder;
said sealing ring having a central opening sized larger than said flexible pipe and extending through said outer end and inner section;
a plurality of longitudinally extending ribs are circumferentially spaced about said central opening, at said outer end said ribs having a radially inner point sized to abut against said pipe extending through said opening;
said inner section being deformable such that as said fastener member is fastened onto said body, said sealing ring has its axially inner section forced inwardly by said flared opening of said socket and pressed into an external surface of said flexible pipe.

13. A tube coupling as defined in claim 12 further characterized by:
said fastener central opening sized greater than said pipe;
said ribs extend above said outer end and extend into said central opening of said fastener.

14. A tube coupling as defined in claim 12 further characterized by:
said ring having an axially inner end having a curve shaped exterior surface section that sits on the outwardly flared opening of said socket;
said curve shaped exterior surface section having at least one notch therein to form a gap between said sealing ring and said body when said sealing ring is seated on said flared opening.

15. A tube coupling as defined in claim 12 further characterized by:
said axially outer end of said sealing ring having a plurality of circumferentially spaced and radially outwardly extending flanges for snap fitting into said fastener and retaining said sealing ring in said fastener.

* * * * *